United States Patent [19]

Olschewski et al.

[11] 4,357,056

[45] Nov. 2, 1982

[54] ANTIFRICTION BEARING FOR LONGITUDINAL MOVEMENTS OF A SHAFT

[75] Inventors: Armin Olschewski, Schweinfurt; Manfred Brandenstein, Eussenheim; Lothar Walter, Schweinfurt; Horst M. Ernst, Eltingshausen; Herbert Dobhan, Bergrheinfeld; Peter Horling, Mainberg, all of Fed. Rep. of Germany

[73] Assignee: SKF Kugellagerfabriken GmbH, Schweinfurt, Fed. Rep. of Germany

[21] Appl. No.: 213,377

[22] Filed: Dec. 5, 1980

[30] Foreign Application Priority Data

Dec. 21, 1979 [DE] Fed. Rep. of Germany ....... 2951586

[51] Int. Cl.³ .................... F16C 29/06; F16C 33/78
[52] U.S. Cl. .................... 308/6 C; 308/187.2
[58] Field of Search ............ 308/6 C, 36.1, 36.2, 308/36.5, 187.2

[56] References Cited

U.S. PATENT DOCUMENTS 3,545,826 12/1970 Magee et al. .................... 308/6 C
3,658,395 4/1972 Hallerback .................... 308/187.2
4,123,121 10/1978 Ernst et al. .................... 308/6 C
4,139,242 2/1979 Ernst et al. .................... 308/6 C
4,181,374 1/1980 Ernst et al. .................... 308/6 C
4,205,885 6/1980 Ernst et al. .................... 308/6 C

FOREIGN PATENT DOCUMENTS 1963102 7/1970 Fed. Rep. of Germany .
2817294 10/1978 Fed. Rep. of Germany ...... 308/6 C
2756247 6/1979 Fed. Rep. of Germany .
2260022 8/1975 France .................... 308/6 C
14031 5/1976 Netherlands .................... 308/6 C Primary Examiner—Richard R. Stearns
Attorney, Agent, or Firm—Daniel M. Rosen

[57] ABSTRACT

The arrangement according to the invention provides a sealing ring fastened to the end ring in a manner secure against removal by pulling or twisting. This sealing ring is provided with thickened extended arms and is fastened by snapping in the thickened arm sections behind an internal radial shoulder through openings in the flange of the end ring. The opening in the flange of the end ring may be economically manufactured, as by means of axial forms or cores, and without the need for additional radial cores, within the casting mold.

17 Claims, 9 Drawing Figures

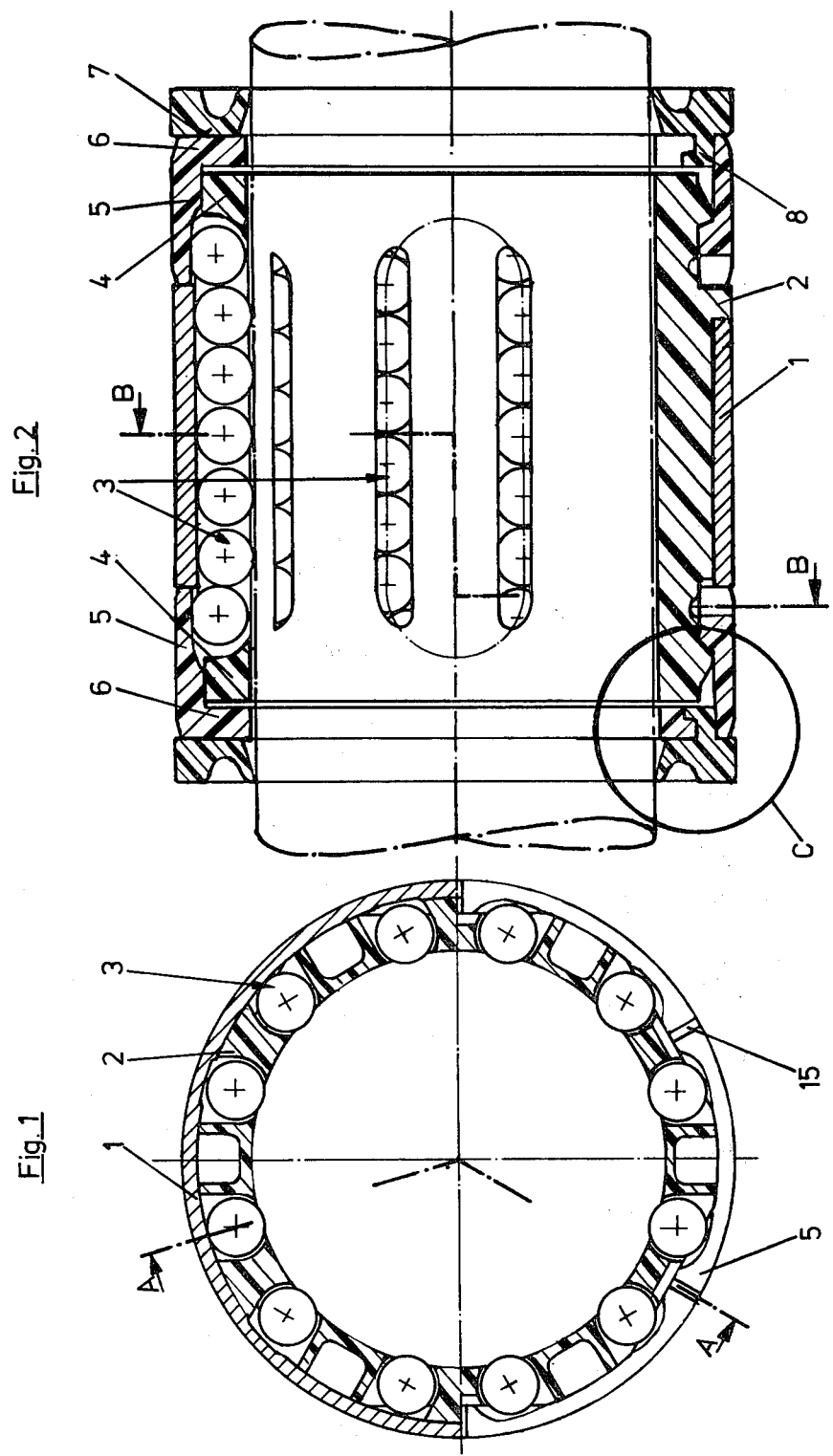

ANTIFRICTION BEARING FOR LONGITUDINAL MOVEMENTS OF A SHAFT

BACKGROUND OF THE INVENTION

The present invention concerns a rolling linear shaft bearing wherein closed rows of rolling elements are distributed around the circumference of the bearing.

Bearings of this type are provided with an outer housing having longitudinal sections distributed over the circumference of the housing bore, such sections bearing the loaded and unloaded raceways of each row of rolling elements. The bearing cage is located in the bore of the outer housing, the cage ends axially protruding with respect to the outer housing. The end ring is manufactured by casting, mounted one each on either end of the bearing cage, and an elastic sealing ring is fixed to each end ring.

DESCRIPTION OF THE PRIOR ART

In a conventional rolling bearing for longitudinal movements, the end rings include, in their bore, an annular slot containing a radially secured sealing ring, which laterally covers the bearing cage. See, for example U.S. Pat. No. 4,123,121. In such conventional rolling bearings the manufacture of the end rings is expensive because the annular slots of the end rings must be introduced into the bore of the end rings, either by means of complicated radial cores during the casting of the rings, or, after the casting, by an additional cutting-type machining. In addition, the sealing ring of the known rolling bearing cannot be easily fastened against twisting within the antifriction bearing. If there is significant thermal expansion of the end ring during operation, the sealing ring may loosen and may rotate on its own, which is undesirable due to the risk of wear.

In applications with lateral lubricant supply, as well as when the sealing ring is replaced, there is no sealing ring at one or both ends of the bearing. In the case of bearings, the respective front side of the bearing cage is then uncovered, so that damage to the bearing cage by means of gripping or mounting tools is not excluded.

If a conventional bearing is not equipped with sealing rings, the annular slot may form an undesirable radial cavity within the bore of the end ring, which cavity retains dirt and dust. Furthermore, the end rings of the friction bearing are then designed unnecessarily wide in an axial direction, which may constitute a disadvantage in case of a narrow mounting space.

It is therefore the object of the invention to provide a rolling linear shaft bearing with a sealing ring which is secured against twisting within the bearing, in a simple manner.

It is a further object of the invention to provide a bearing cage with protection against dirt contamination or damage, even when one or both sealing rings are disassembled. It is another object of the invention to provide a linear rolling bearing of economic manufacture and simple assembly, as one compact structure unit.

BRIEF DESCRIPTION OF THE INVENTION

The arrangement according to the invention provides a sealing ring fastened to the end ring in a manner secure against removal by pulling or twisting. This sealing ring is provided with thickened extended arms and is fastened by snapping in the thickened arm sections behind an internal radial shoulder through openings in the flange of the end ring. The opening in the flange of the end ring may be economically manufactured, as by means of axial forms or cores, and without the need for additional radial cores, within the casting mold. No subsequent machining of the end ring, which would render manufacture more expensive, is required. Furthermore, the flange, which laterally covers the bearing cage, provides protection against the penetration of undesirable contamination within the antifriction bearing, as for example when the sealing rings are disassembled. Furthermore, the flange of the end rings ensures that the bearing cage is protected against shocks of mounting tools and the like, when the sealing rings are assembled or when the antifriction bearing is axially pressed onto its seat in the bore of a housing. In the assembly of the antifriction bearing or replacement of parts (substitution of seals), the sensitive sealing rings may be preassembled onto the pertinent end ring, at the factory, producing a sturdy structural unit together with the end ring. Therefore, the sealing rings are protected against damage upon the subsequent assembly of the antifriction bearing.

In a further embodiment, traversing openings are provided in the end ring which is easily molded by means of pins running in the axial direction of an axial core used to form the casting mold. Alternatively, a simple snap-button type fastening of the arms in the end ring is employed.

In accordance with a further embodiment the end ring and associated sealing ring are retained at the end of the bearing cage, secured against removal by either twisting or axial pulling, or both.

In an additional embodiment, the sealing ring is fastened to the end ring which relatively low mounting forces, since the radial projection of each arm is pressed radially outward, in accordance with the elastic bending of the arm, when the arms are pressed into the opening of the end ring.

In a further embodiment a simple fastening of the sealing ring to the end ring, with simultaneous security against twisting of the end ring on the bearing cage, is achieved by providing an indentation in the cage for a projection on the arm.

In an additional embodiment, the arms of the sealing ring are located radially outward, by means of a radial recess in the ring so that the bearing cage can feature a relatively large outside diameter, even at its ends, for the purpose of accommodating the rolling elements.

In a still further embodiment, the end rings are secured with an associated sealing ring on the respective end of the bearing cage, not only against twisting, but also against pulling off from the bearing cage, by a retaining catch on the sealing ring.

Finally, a further embodiment provides for openings and recesses in the end ring produced in particularly economic fashion, by means of smooth, shoulderless pins, in the axial core of the casting mold for the end rings.

BRIEF DESCRIPTION OF THE DRAWINGS

The antifriction bearing for longitudinal movements according to the invention shall be explained in the description below on the basis of several examples of embodiments, as represented in the drawings, wherein:

FIG. 1 shows a cross-section along line B—B of the antifriction bearing represented in FIG. 2;

FIG. 2 shows a longitudinal section along line A—A through the antifriction bearing represented in FIG. 1;

DETAILED DESCRIPTION OF THE INVENTION

Figure 3:
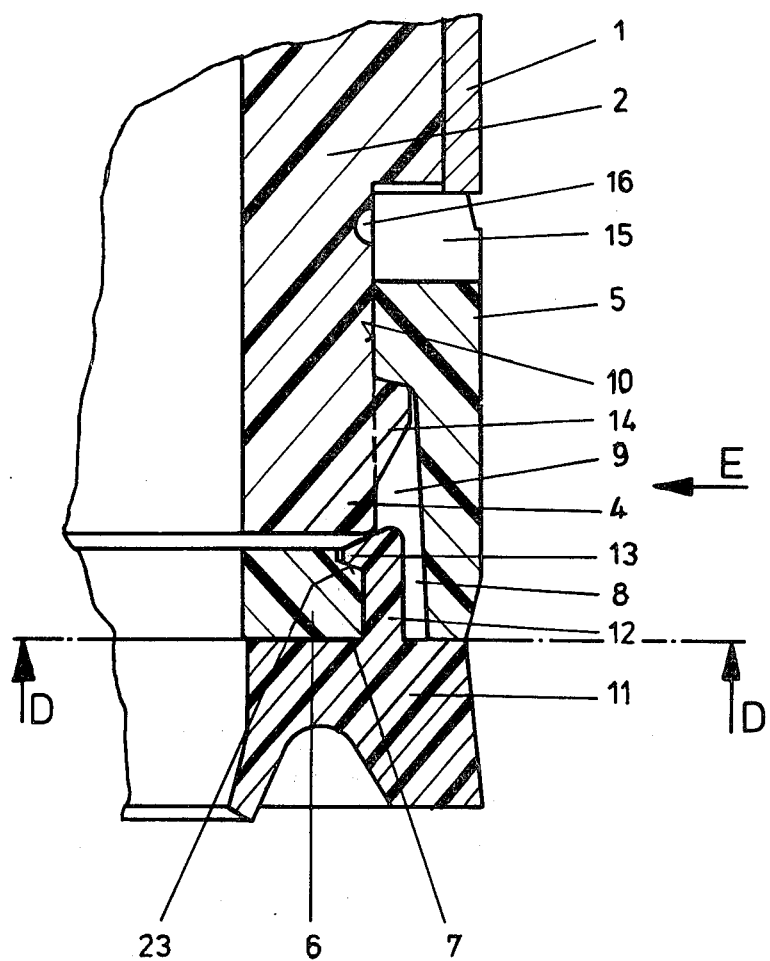
FIG. 3 shows a magnified section C of the antifriction bearing represented in FIG. 2.

In FIGS. 1 and 2, 1 represents th external housing of a rolling bearing for longitudinal movements. In the bore of this external housing 1 there is located the bearing cage 2 with closed rolling-element rows 3, which are distributed over the bearing circumference. In the bore of external housing 1 there are located longitudinal sections, distributed over the circumference, which bear the loaded and unloaded raceways of each rolling-element row 3.

Bearing cage 2 has two ends 4 which protrude axially in relation to external housing 1. On each end 4 of bearing cage 2 there is mounted an end ring 5, which is manufactured by casting, e.g., injection-molding, and may consist of plastic.

This end ring 5 has a flange 6, running radially inward, that covers bearing cage 2 on the front side, which flange forms an external front side 7 on end ring 5. Axially running openings 8 are provided on the circumference of this front side 7.

Figure 4:
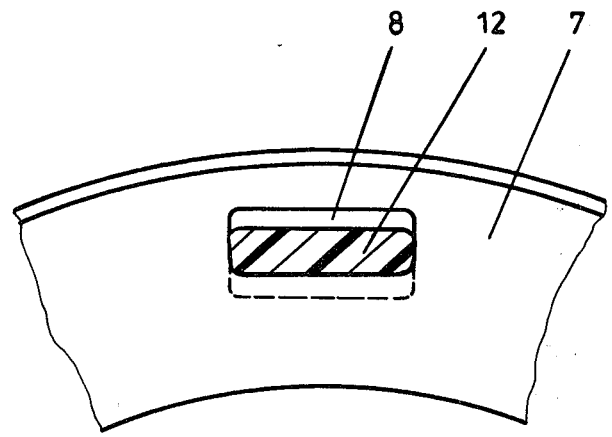
FIG. 4 shows a sectional view along line D—D, in FIG. 3.

As can be seen in particular in FIGS. 3 and 4, this opening 8 extends through flange 6 and ends without a shoulder in an adjacent radial recess 9, in bore surface 10 of end ring 5, which surface is located on end 4 of bearing cage 2. The cross-section of opening 8 is constant along the depth of the opening. The cross-section is larger in a circumferential direction than in a radial direction (FIG. 4).

On each of the external front-sides 7 of the two end-rings 5 there is fastened an elastic sealing ring 11. This sealing ring 11, on the side thereof facing the front-side 7, is provided with arms 12 extending in an axial direction, with a projection 13, pointing radially inwards, formed as a thickening at the respective ends. Each of the arms 12 of the sealing ring 11 engages in an associated opening 8, in a manner such that the projection 13 snaps behind a radial shoulder of end ring 5. This shoulder is formed, in the present case, by the stepwise front surface 23 of flange 6, which points inward in an axial direction. The cross-section of arms 12 is matched on a positive manner with the cross-section of opening 8, whereby a small radial clearance is provided between each arm 12 and the radial external wall of opening 8 (FIG. 4).

When sealing ring 11 is fastened to end ring 5, the latter is placed axially against end ring 5, so that its arms 12 can be pressed axially into the associated opening 8. In so doing, the arms 12 are somewhat bent radially outward, as a result of contact by the projection 13 with the wall of opening 8, the arms 12 being flexurally stretched in an elastic manner. At the end of the pressing passage of arms 12 into opening 8, sealing ring 11 comes in contact with the front surface 7 of end ring 5. At the same time the arm 12, bearing projection 13, enters recess 9, projection 13 snaps behind front surface 23 of flange 6, and thus axially fixes sealing ring 11 to end ring 5. Each arm 12 furthermore touches the radial inner wall of opening 8, under elastic pre-tension, so that sealing ring 11 is held against end ring 5 in a manner that is free of play, centered, and secure against twisting. The end ring 5, together with the sealing ring 11, forms a rugged preassembled structural unit, which may be mounted and dismounted without risk of damaging the sensitive sealing ring 11.

Figure 5:
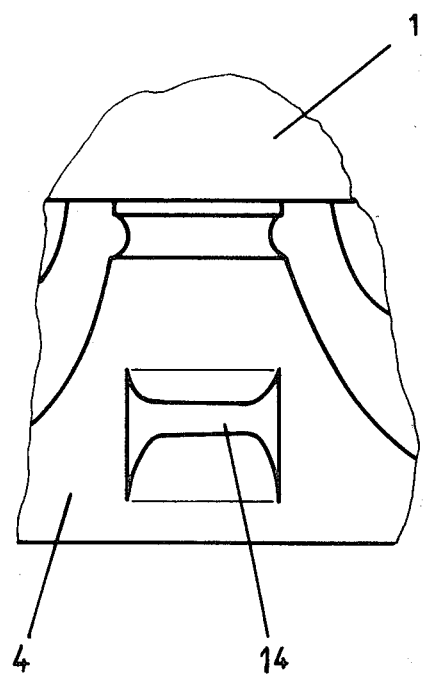
FIG. 5 shows a view according to arrow E [FIG. 3] onto the end of a bearing cage without end ring and without sealing ring.

A retaining catch 14 that protrudes radially over the perimeter surface of end ring 4 of bearing cage 2 (FIG. 5) engages recess 9 in a positive manner, so that end ring 5 is secured on bearing cage 2 in an axial direction and against twisting. When end ring 5 is mounted, it is pushed with sealing ring 11 on end 4 of bearing cage 2, in an axial direction so that end ring 5 is pushed with its bore 10 over retaining catches 14 and is somewhat spread, elastically. In so doing, the internal front-surface of end ring 5 finally comes into contact with external housing 1, and retaining catch 14 snaps into recess 9 in the bore of end ring 5. In so doing, both the arm 12 of sealing ring 11 that carries projection 13, and the radially protruding retaining catch 14 of bearing cage 2, engage in a positive manner in recess 9.

On the internal front-side of end ring 5, radially running indentations 15 are provided, for the supply of lubricant via channels 16, into the inside of the bearing.

Figure 6:
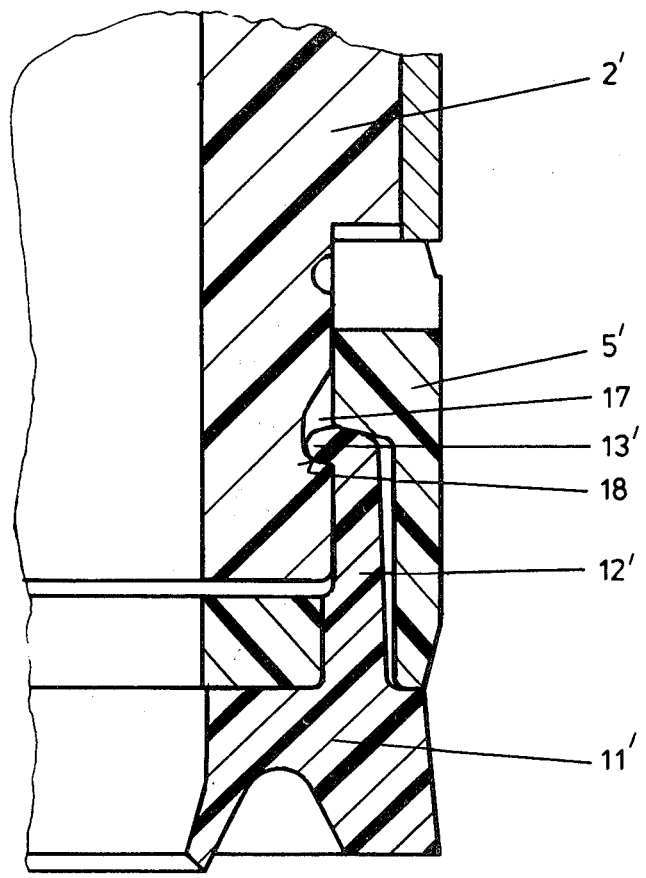
FIG. 6 shows a magnified section of a longitudinal section through a modified antifriction bearing.

In FIG. 6 there is indicated a partial longitudinal section of a modified rolling bearing, which is constructed in a manner similar to the rolling bearing shown in FIGS. 1 to 5, with corresponding elements of different shape being primed. Each arm 12' of sealing ring 11' again has a projection 13' facing radially inward, as a thickening. This projection, again as in the previously described example of implementation, engages through the opening 8 in the recess 9 that follows it without a shoulder. However, here there is a radial cavity 17 machined into the perimeter surface of end 4 of bearing cage 2', which cavity features a lateral wall 18 that serves as a radial shoulder, and faces axially inward. Projection 13' of each arm 12', in this embodiment, thus snaps behind lateral wall 18, so that sealing ring 11' and end ring 5' are fastened to bearing cage 2', by means of arms 12', against axial removal as well as against twisting. In this fashion, no retaining catches for securing end ring 5' on the bearing cage 2' need be provided on the perimeter surface of end 4 of bearing cage 2'.

Figure 7:
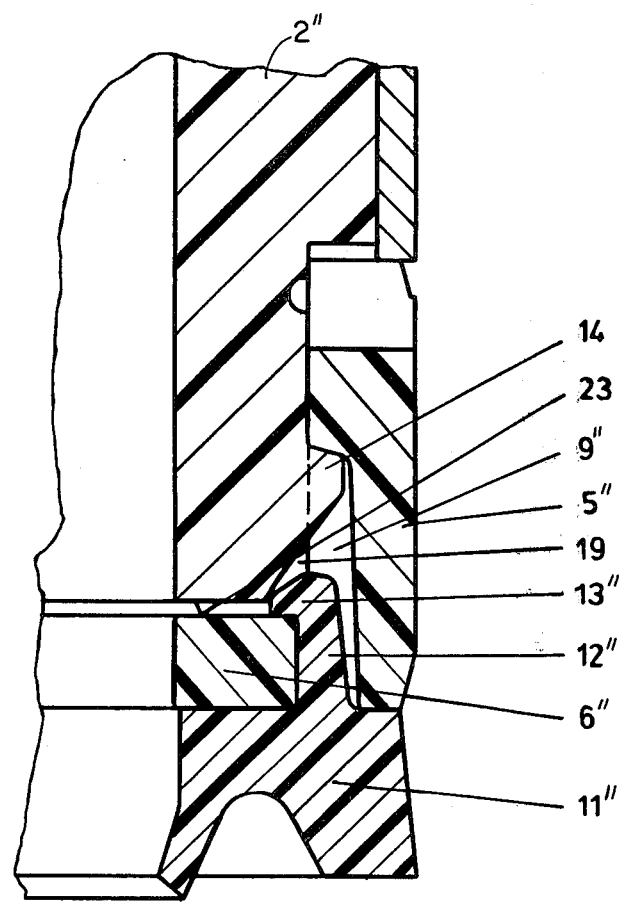
FIG. 7 shows a magnified section of a longitudinal section through a further modified antifriction bearing.

FIG. 7 shows a partial longitudinal section of a further modified bearing, which is again designed in a manner similar to that described in FIGS. 1 to 5, corresponding elements of different shape being double primed. Again, the thickening on the end side is provided in the form of a projection 13", pointing radially inward, on each arm 12" of sealing ring 11". This projection 13" is also arranged so as to snap behind a shoulder of end ring 5", which shoulder is formed by the plane front-surface 23 of flange 6", which surface points axially inward. However, here projection 13" engages radially in an indentation 19, on the end side of bearing cage 12", in a fashion such that here not only is sealing ring 11" secured against twisting in end ring 5", but also end ring 5″ is secured against twisting on bearing cage 12″.

Figure 8:
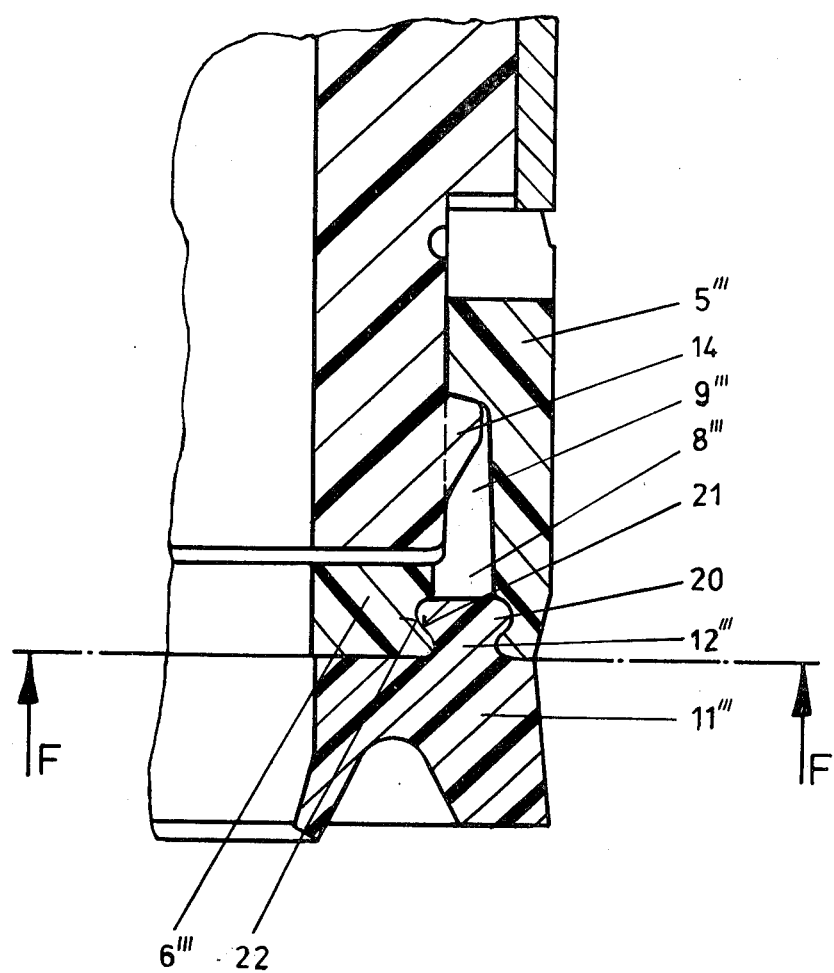
FIG. 8 shows a magnified section of a longitudinal section through a further modified antifriction bearing.
Figure 9:
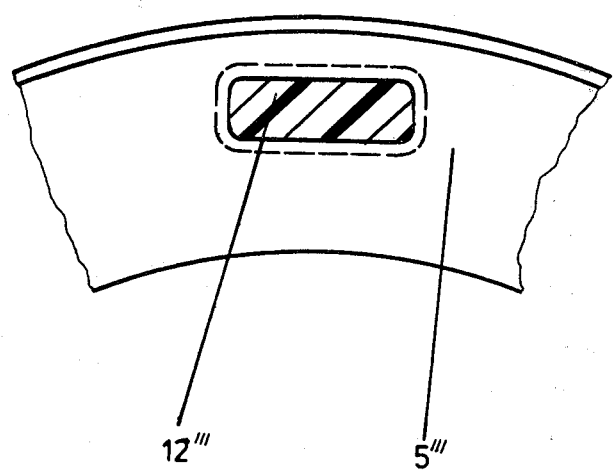
FIG. 9 shows a sectional view along line F—F, in FIG. 8.

FIGS. 8 and 9 indicate, in partial cross-sectional views, a further modified bearing, with elements of different shape than those corresponding to the embodiment of FIGS. 1–5 being triple primed, featuring a sealing ring 11‴ with arms 12‴, which arms feature at their ends a snap-button type thickening 20. The shoulder is formed by the lateral wall 21, pointing axially inwards, of a groove that is machined into the circumference of opening 8‴. The sealing ring 11‴ here consists of an elastic compressible material, such as plastic. Upon mounting and axially pressing-on sealing ring 11‴, arms 12‴ are pushed into opening 8‴. In so doing, the thickened parts 20 are first pushed together in an elastic manner, until these thickened parts snap into groove 22, and thus secure sealing ring 11‴ against end ring 5‴, in a twist-proof fashion. By the same token, the end ring 5‴ with built-in sealing ring 11‴ may be gripped and pressed axially, by means of appropriate tools (not shown), whenever sealing ring 11‴ must be disassembled or replaced.

The examples of implementation described above, for a linear rolling bearing, may be widely modified, within the framework of the concept of the invention. In particular, the cross-section of the openings in the end ring and the cross-section of the arms of the sealing means accommodated into these openings, may feature, depending on the nature of their stress and/or the construction of the antifriction bearing, an essentially rectangular or circular form. This form may be easily changed, by replacing the mold pins used in the axial of a casting mold for the end ring, without causing major tooling costs.

Furthermore, the sealing ring may protrude radially over the perimeter surface of the external housing and of the end ring, and thus may form an abutting shoulder for the axial fixation of the bearing in a housing or similar device. Other embodiments within the spirit and scope of the invention will be apparent to those skilled in the art.

What is claimed is:

1. In a rolling bearing for longitudinal movements of a shaft, having closed rows of rolling elements distributed around the circumference of the bearing, an outer housing with longitudinal sections distributed over the circumference of the housing's bore, said sections bearing the loaded and unloaded raceways of each row of rolling elements, a bearing cage located in the bore of the outer housing, said cage having its ends axially protruding from the outer housing, a cast end ring mounted on each end of said bearing cage, and an elastic sealing ring fixed to the end ring, the improvement comprising a flange on each said end ring extending radially inward to cover the axial ends of said bearing cage and define the axial ends of said rolling bearing, said flange having axial directed openings extending therethrough and distributed over the circumference thereof, said rolling bearing having an internal shoulder at each axial end thereof, said sealing ring, on its side facing the axial ends of said cage, having a plurality of arms extending in an axial direction with a thickened portion on the ends thereof, each of said arms engaging an associated opening with its thickening portion snapped behind said shoulder.

2. The bearing of claim 1 wherein said shoulder comprises a radial extending surface of said end rings.

3. The bearing of claim 1 wherein said shoulder comprises a radial extending surface of said bearing cage.

4. The bearing of claim 1, wherein said end ring flange opened traverses said flange and said shoulder is formed by an axially inwardly facing surface of said flange.

5. The bearing of claim 1, wherein said shoulder is formed by a groove machined into the circumference of said opening.

6. The bearing of claim 1, wherein said shoulder is formed by a lateral wall, facing axially inward, of a radial cavity machined into the associated end of the bearing cage.

7. The bearing of claim 1, wherein said thickening is formed by a projection facing radially inward, on said arm.

8. The bearing of claim 7, wherein said projection radially engages an indentation at the end of said bearing cage.

9. The bearing of claim 1, wherein said opening traverses said flange of said end ring and blends in stepless fashion into an adjacent radial recess in a bore surface of said end ring, which surface is located at the associated end of said bearing cage.

10. The bearing of claim 9, wherein both the respective arm of said sealing ring and a retaining projection radially protruding from the perimeter surface of the end of said bearing cage extend into said recess.

11. The bearing of claim 1, wherein said opening has a cross-section that is constant along its depth.

12. The rolling bearing of claim 1 wherein said end rings have axially extending portions extending over the axial ends of said cage, said axially extending portions having radially directed recesses on their inner surfaces for catching radially extending protrusions on said cage, for holding said cage and end rings together.

13. The rolling bearing of claim 12 wherein said shoulder comprises an annular recess on the side of said flange facing the axial end of said cage and adjoining said openings, said openings being aligned and extending into said recesses on the axial portions of said flange.

14. The rolling bearing of claim 12 wherein the axial ends of said cage have annular recesses at their radial outer portion, the axial inner surface of said flange being planar and defining said shoulder, said arms extending into said annular recess to engage said shoulder, said openings being aligned with and joining the recesses in the axial portion of said end ring.

15. The rolling bearing of claim 12 wherein said openings are generally rectangular and are aligned with and join said recesses in the axial portions of said end ring, said openings having grooves formed in their internal surfaces to define said shoulder.

16. The rolling bearing of claim 1 wherein said end rings have axially extending portions extending over the ends of said cage, and recesses in their radial inner surface aligned with and joining said openings, and further comprising radial cavity means on said cage adjacent the axial ends of the recesses of said axial portions, said arms extending through said openings to abut the axial inner end of said recesses, second end portions of the arms extending radially inward into said cavities, whereby said cavities form said shoulder.

17. A rolling bearing having an improved end seal comprising a housing, an end ring covering one end of the housing of said bearing to define the axial end of the bearing and including a radially inward directed flange, said flange having axially extending openings extending therethrough and distributed about its circumference, and an end ring seal having a plurality of axially inwardly directed arms aligned with said openings, said arms having shaped end portions passed through said openings and engageable within said bearing housing for securing said ring seal in position.

* * * * *

UNITED STATES PATENT AND TRADEMARK OFFICE
CERTIFICATE OF CORRECTION

PATENT NO. : 4,357,056
DATED : Nov. 2, 1982
INVENTOR(S) : Olschewski et al.

It is certified that error appears in the above-identified patent and that said Letters Patent are hereby corrected as shown below:

Col. 1, line 56, delete --then--.

Col. 2, line 34, change "which" to --with--.

Col. 3, line 56, change "stepwise" to --stepped--.

Col. 4, line 19, after "is" add --to be--.

Col. 6, line 36, after "aligned" add --with--.

Signed and Sealed this

First Day of May 1984

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,357,056
DATED : November 2, 1982
INVENTOR(S) : ARMIN OLSCHEWSKI ET AL.

It is certified that error appears in the above—identified patent and that said Letters Patent is hereby corrected as shown below:

Col. 5, line 55 - change "axial" to -- axially --.
Col. 5, line 61 - change "thickening" to -- thickened --.
Col. 5, line 64 - change "radial" to -- radially --.
Col. 5, line 66 - change "radial" to -- radially --.
Col. 5, line 68 - change "opened" to -- opening --.

Signed and Sealed this

Eighteenth Day of September 1984

[SEAL]

Attest:

GERALD J. MOSSINGHOFF

Attesting Officer

Commissioner of Patents and Trademarks